J. C. STEPHENS.
HEATING APPARATUS FOR USE IN OIL WELLS.
APPLICATION FILED JULY 26, 1920.
1,383,777.
Patented July 5, 1921.
2 SHEETS—SHEET 1.
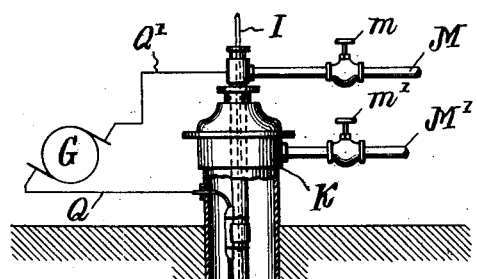
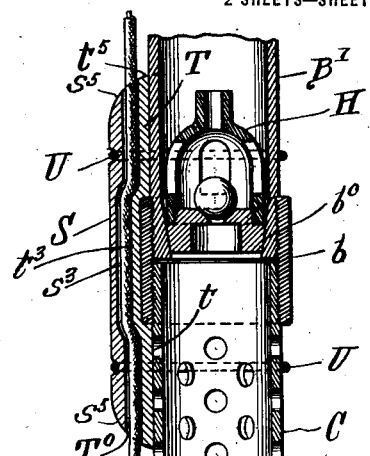
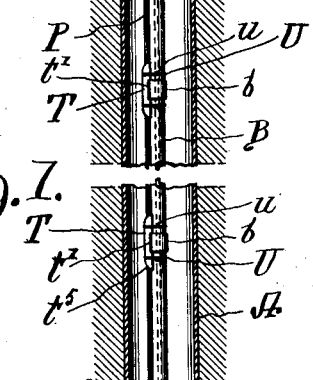
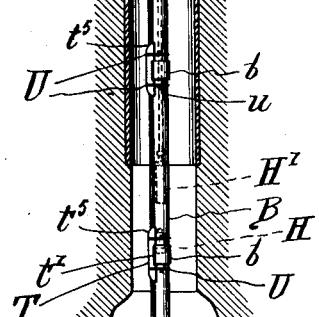
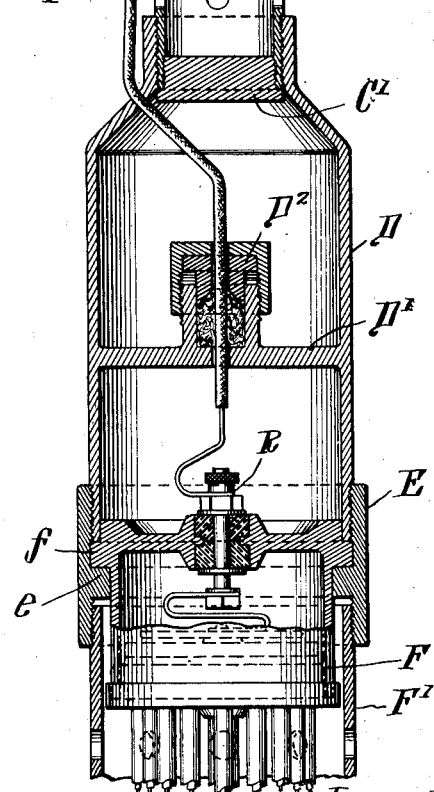
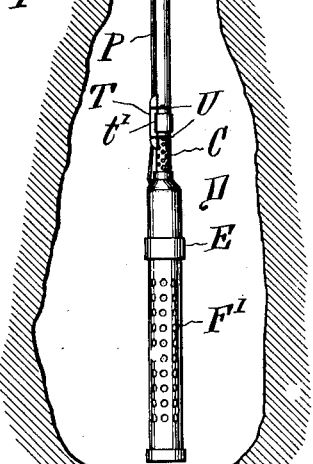
Inventor
J. C. Stephens
by Wilkinson & Giusta,
Attorneys J. C. STEPHENS.
HEATING APPARATUS FOR USE IN OIL WELLS.
APPLICATION FILED JULY 26, 1920.
1,383,777.
Patented July 5, 1921.
2 SHEETS—SHEET 2.
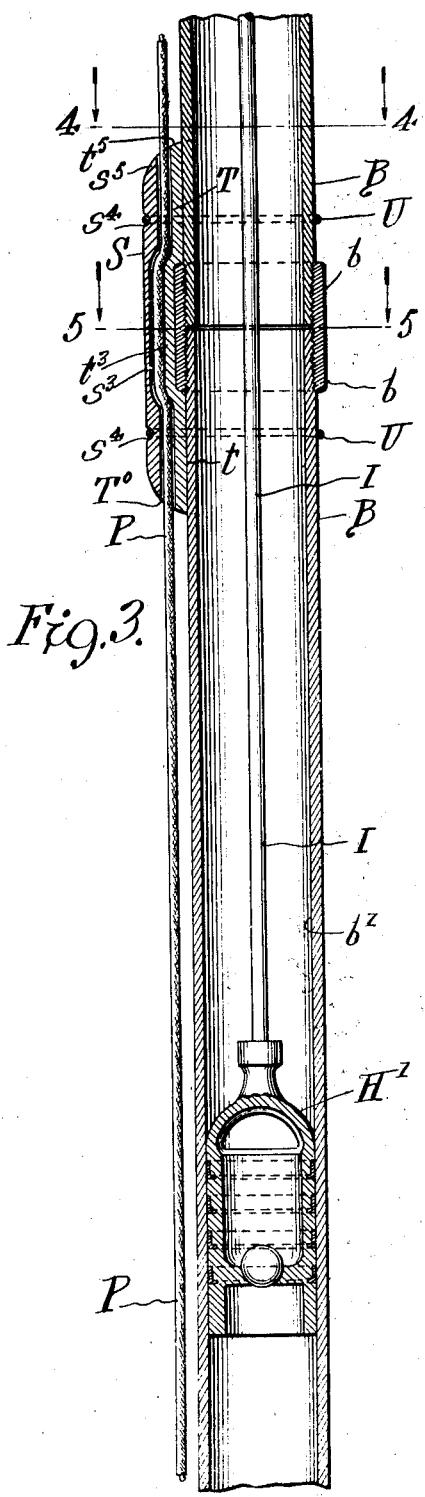
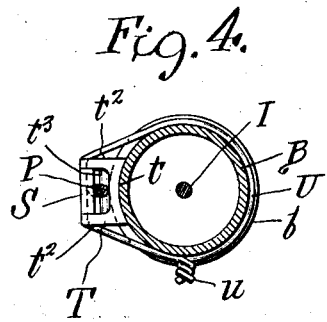
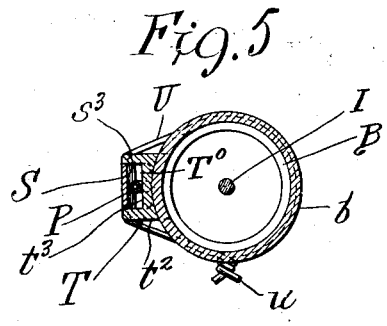
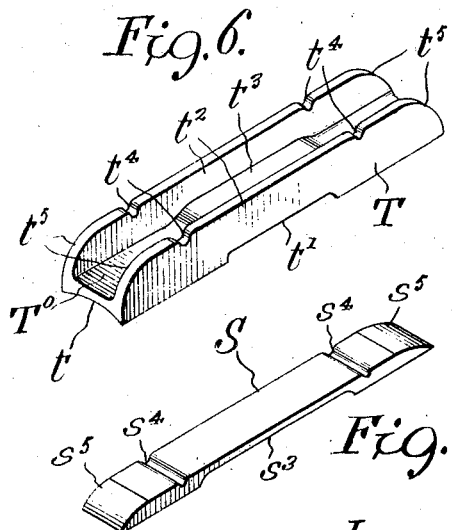
Inventor
J. C. Stephens
by Wilkinson & Gusta
Attorneys

UNITED STATES PATENT OFFICE.

JAMES CARLYLE STEPHENS, OF NORFOLK, VIRGINIA, ASSIGNOR TO HUFF PROCESS COMPANY, OF WILMINGTON, DELAWARE, A CORPORATION OF DELAWARE.

HEATING APPARATUS FOR USE IN OIL-WELLS.

1,383,777.  Specification of Letters Patent.  Patented July 5, 1921.

Application filed July 26, 1920. Serial No. 398,869.

*To all whom it may concern:*

Be it known that I, JAMES CARLYLE STEPHENS, a citizen of the United States, residing at Norfolk, in the county of Norfolk and State of Virginia, have invented certain new and useful Improvements in Heating Apparatus for Use in Oil-Wells; and I do hereby declare the following to be a full, clear, and exact description of the invention, such as will enable others skilled in the art to which it appertains to make and use the same.

It is well known that all oil wells will ultimately cease to produce oil no matter how great may be the initial flow, or how much may be the quantity of oil in the ground contiguous to the well. The causes for the failure of the oil to flow are not only the actual removal of a large portion of the oil from the ground, but also the falling off of the gas pressure, or the choking up of the crevices through which the oil flows with paraffin or other matter which tends to impede and finally stop altogether the flow of the oil, or in any event cause it to flow so slowly that the well is no longer commercially productive.

It has long been known that the application of heat locally to the oil producing veins or sands would tend to melt the paraffin or to thin the oil and cause it to flow more freely, and also would generate gas which would tend to promote the resumption of the flow of the oil, and various methods have been devised for heating the well by steaming, hot air, hot water, or by electric heaters.

Electric heaters probably afford a more convenient mode of applying locally the heat and continuing indefinitely its application, but the use of such heaters is attended with many serious objections which have hitherto rendered all electric apparatus devised for this purpose, as far as I am aware, inadequate and unsatisfactory.

Among the objections referred to is the fact that the well casings are of necessarily limited diameter, generally less than 7 inches, and the transverse diameter of the heater must therefore be less than the inner diameter of the well casing. Besides this, space must be left for the flow of the oil past the heater. The consequence is it has been found very difficult to generate enough heat to exercise any substantial effect upon the adjacent oil bearing strata.

Again, there have been great difficulties in securing the proper insulation, not only of the parts of the heaters themselves, but also for the conducting wires from which the heater is suspended; these oil wells being frequently 3000 feet more or less in depth.

It will be noted that the heater must be capable of efficient use in water, crude oil, or salt water such as is found in wells. Great difficulties are also experienced in taking care of sudden expansion and contraction of the parts, due to certain changes in the temperature.

In order to remedy as far as practicable certain of the objections as have just been noted, I have devised the present invention, which will be more clearly understood after reference to the accompanying drawings, in which like parts are indicated by similar reference symbols throughout the several views, and in which:—

Figure 1 is a diagrammatic view showing a section through the well casing with the inner tube in elevation, and the electric heater suspended from the inner tube.

Fig. 2 is a sectional elevation on a larger scale showing the connection between the conducting electric cable and the heater, and shows the check valve for the pump.

Fig. 3 is a similar view to Fig. 2, but higher up on the inner tube, and shows the electric cable in elevation, and also shows the upper valve for the pump.

Fig. 4 shows a section along the line 4—4 of Fig. 3, and looking down.

Fig. 5 shows a section along the line 5—5 of Fig. 3, and looking down.

Fig. 6 is a detail showing the insulating channeled block used for attaching the electric cable to the inner tube of the well; and Fig. 7 is a detail showing the cap used in connection with said block.

A represents the outer casing of the well which is inserted in the usual way, and B represents the inner tube which is formed as usual of a series of sections connected together by screw-threaded coupling sleeves $b$ shown in detail in Figs. 1, 2 and 3.

At the lower end of the inner tube a short perforated tube C is attached just below the check valve of the pump, and the lower end of this tube is preferably closed as by the block C'.

Screwed on to the lower end of this perforated tube C is a junction box D, separated by the web D' into an upper and a lower chamber, the lower chamber being made liquid tight as by means of the packing gland $D^2$. At the lower end of this junction box D, I provide a union sleeve E, provided with a shoulder $e$ to receive and support the flange $f$ of the upper head of the heater F, which heater is inclosed in the perforated protecting casing F'.

The construction and operation of the heater is fully described in my application filed July 20, 1920, Serial No. 397591, and entitled Improvements in heating apparatus for use in oil wells, and I do not mean to limit the invention to details of construction of the heater *per se*, as any suitable heater may be adopted in connection with the apparatus that will be hereinafter more fully described and claimed.

In the construction shown in Figs. 2 and 3, the lower section B' of the inner tube is of special make to form a pump barrel, with a valve seat $b^0$ at its lower end for the check valve H of the pump, and having its inner surface $b'$ polished to form a tight joint with the pump piston H', which pump piston may be raised or lowered in the operation of pumping by means of a suitable cable I. In place of a cable a jointed rod may be used if desired.

The upper end of the well casing A is closed by a suitable cap K, having the outlet pipe M connected to the inner tube and controlled by the valve $m$, and the outlet pipe M' opening into the top of the well casing A and controlled by the valve $m'$.

G represents a dynamo or other suitable source of electricity, the current from which is carried through the conductor Q to the electric cable P, and the return circuit is completed by the connection Q' which is grounded to the upper end of the inner tube which serves as a return conductor for the current which enters the heater through the cable P, and is carried from the heater by the inner tube B, as before stated.

The lower end of this conductor P passes through the packing gland $D^2$, and is connected to the binding post R, shown in Fig. 2, and thence led into the heater coils, as fully described in my application hereinbefore referred to.

So as not to interfere with the operation of the pumping apparatus I provide an arrangement by means of which the conducting cable P is secured on the exterior of the inner tube in such a way that this cable is protected from injury, especially about its insulation, and in which the weight of the long cable, which may be 3000 feet more or less in length, is not suspended from one end but is taken up by a series of supports distributed along the inner tube.

A simple and efficient attaching, supporting and insulating arrangement is shown in detail in Figs. 1 to 7, and the body of the insulating block is shown in perspective in Fig. 6 and the cap for the same is shown in perspective in Fig. 7.

Referring especially to Figs. 6 and 7, T represents a block channeled on its back, as at $T^0$, and provided with a curved inner face $t$ adapted to fit the contour of the inner tube, or of the coupling sleeve, as the case may be.

Midway of its back, this block is indented, as at $t'$, to fit the coupling sleeve $b$, and it is provided with two side walls $t^2$ and with a raised bottom portion $t^3$ forming a channel $T^0$ into which the cable is pressed laterally as shown in Fig. 3. The tops of the side walls $t^2$ are notched as at $t^4$, and the ends of the block are rounded as at $t^5$, so as not to catch in any ordinary obstruction such as might be experienced in lowering the inner tube into the outer well casing.

The top of the block is closed by means of a cap S, which has a raised portion $s^3$ to register with the raised portion $t^3$ of the block T, and also with notches $s^4$ to register with the notches $t^4$ of said block T, and the ends of the cap S are rounded as at $s^5$ to register with the rounded ends $t^5$ of the side walls $t^2$ of the block T.

As the sections of the inner tube are lowered into the well one of the blocks T is fitted over the corresponding junction sleeve $b$, the cable is pressed laterally into the channel $T^0$ in said block, the cap S is then pressed in place and the cap is drawn inward into binding engagement with the cable, causing the cable to be tightly held in the block T by means of suitable fastening means, such as lengths of wire U, whose ends may be twisted together as at $u$; but any suitable binding means may be adopted if desired.

It will also be noted that the block T with its cap S will firmly grip the electric cable P and will support a short length of said cable so that the entire weight of the cable is supported not from the top of the well but by a series of these supporting blocks, which serve not only to support a short length of the cable, but also serve to protect the insulation on the cable from injury. These blocks T and the caps S should preferably be made of vulcanized fiber, or wood, or any suitable strong electrical insulating material.

When the inner tube is raised out of the well for any cause, each junction sleeve $b$ is raised to the top of the well and the corresponding binding wire U may be cut or loosed and the cable with the block attached may be removed, and the block and its cap removed from the cable for further use.

In lowering the inner tube back into the well, the supporting blocks for the cable may be applied *seriatim* and the lengths of the cable gripped therein, as hereinbefore described.

While I have shown the supporting and insulating blocks located over each coupling sleeve, it will be obvious that the blocks may be placed at each second or each third coupling sleeve, or even farther apart, dependent upon the nature of the conditions prevailing at the well.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. Heating apparatus for use in oil wells comprising an inner tube projecting down into the well casing and formed of a series of separable sections connected together by coupling sleeves, an electric heater suspended from said inner tube, a series of channeled blocks secured over and engaging said coupling sleeves, and an electric cable passing through said series of blocks and having its outer surface gripped at intervals by said blocks, said cable being connected to said heater, substantially as described.

2. Heating apparatus for use in oil wells, comprising an inner tube projecting down into the well casing and formed of a series of separable sections connected together by coupling sleeves, an electric heater suspended from said inner tube, a series of channeled blocks of insulating material secured over and engaging said coupling sleeves, caps covering the channels in said blocks, and an electric cable passing through said series of blocks and having its outer surface gripped at intervals by said blocks and caps, said cable being connected to said heater, substantially as described.

3. Heating apparatus for use in oil wells comprising an inner tube projecting down into the well casing and formed of a series of separable sections connected together by coupling sleeves, an electric heater suspended from said inner tube, a series of channeled blocks of insulating material curved to fit the outer contour of the inner tube secured over and engaging said coupling sleeves, and an electric cable passing through said series of blocks and having its outer surface gripped at intervals by said blocks, said cable being connected to said heater, substantially as described.

4. Heating apparatus for use in oil wells, comprising an inner tube projecting down into the well casing and formed of a series of separable sections connected together by coupling sleeves, an electric heater suspended from said inner tube, a series of channeled blocks of insulating material curved to fit the outer contour of the inner tube, secured over and engaging said coupling sleeves, caps covering the channels in said blocks, and an electric cable passing through said series of blocks, with means for fastening said caps on said blocks whereby said cable is gripped at intervals by said blocks and caps, said cable being connected to said heater, substantially as described.

5. Heating apparatus for use in oil wells, comprising an inner tube projecting down into the well casing and formed of a series of separable sections connected together by outwardly projecting coupling bands, an electric heater suspended from said inner tube, a series of channeled blocks engaging said coupling bands, and an electric cable passing through said series of blocks and having its outer surface gripped at intervals by said blocks, said cable being connected to said heater, substantially as described.

6. Heating apparatus for use in oil wells, comprising an inner tube projecting down into the well casing and formed of a series of separable sections connected together by outwardly projecting coupling bands, an electric heater suspended from said inner tube, a series of channeled blocks of insulating material engaging said coupling bands, caps covering the channels in said blocks, and an electric cable passing through said series of blocks and having its outer surface gripped at intervals by said blocks and caps, said cable being connected to said heater, substantially as described.

7. An insulating and supporting means for electrical conductors for use in heating apparatus for oil wells, comprising a channeled block adapted to fit the outer contour of the inner tube of the oil well, a cap adapted to fit over the channel in said block, and means for simultaneously fastening said cap on said block, and fastening the two to the exterior of the inner tube, thereby clamping the electrical conductor at intervals to the inner tube, substantially as described.

8. An insulating and supporting means for electrical conductors for use in heating apparatus for oil wells, comprising a channeled block adapted to fit the outer contour of the inner tube of the oil well, a cap adapted to fit over the channel in said block, the bottom of said channel and the lower face of said cap being provided with curved coacting surfaces adapted to engage the conductor and prevent it from slipping, and means for simultaneously fastening said cap on said block, and fastening the two to the exterior of the inner tube, thereby clamping the electrical conductor at intervals to the inner tube, substantially as described.

9. An insulating and supporting means for electrical conductors for use in heating apparatus for oil wells, comprising a channeled block adapted to fit the outer contour of the inner tube of the oil wells, a cap adapted to fit over the channel in said block, the bottom of said channel and the lower face of said cap being provided with curved coacting surfaces adapted to engage the conductor and prevent it from slipping, and the ends of said block and cap being rounded, and means for simultaneously fastening said cap on said block, and fastening the two to the exterior of the inner tube, thereby clamping the electrical conductor at intervals to the inner tube, substantially as described.

JAMES CARLYLE STEPHENS.